United States Patent [19]
Brooke

[11] 3,936,171
[45] Feb. 3, 1976

[54] ELECTROSTATOGRAPHIC METHODS AND APPARATUS

[75] Inventor: Edric Raymond Brooke, Welwyn Garden City, England

[73] Assignee: Xerox Corporation, Stamford, Conn.

[22] Filed: Mar. 11, 1974

[21] Appl. No.: 450,268

[30] Foreign Application Priority Data

June 25, 1973 United Kingdom............... 30009/73

[52] U.S. Cl......................... 355/3 R; 355/23; 355/26
[51] Int. Cl.$^2$........................................... G03B 27/00
[58] Field of Search ....................... 355/3, 23, 24, 26

[56] References Cited

UNITED STATES PATENTS

| | | | |
|---|---|---|---|
| 2,331,113 | 10/1943 | Fassel | 355/24 |
| 3,580,670 | 5/1971 | Bhagat | 355/23 |
| 3,775,102 | 11/1973 | Punnett | 355/3 |

*Primary Examiner*—John M. Horan

[57] ABSTRACT

Apparatus for forming electrostatographic reproductions back-to-back on suitable support surfaces including first and second photoconductive imaging surfaces and means to provide a developed image on each photoconductive surface and provide simultaneous transfer of the developed images from the photoconductive surfaces onto both of the support surfaces.

10 Claims, 1 Drawing Figure

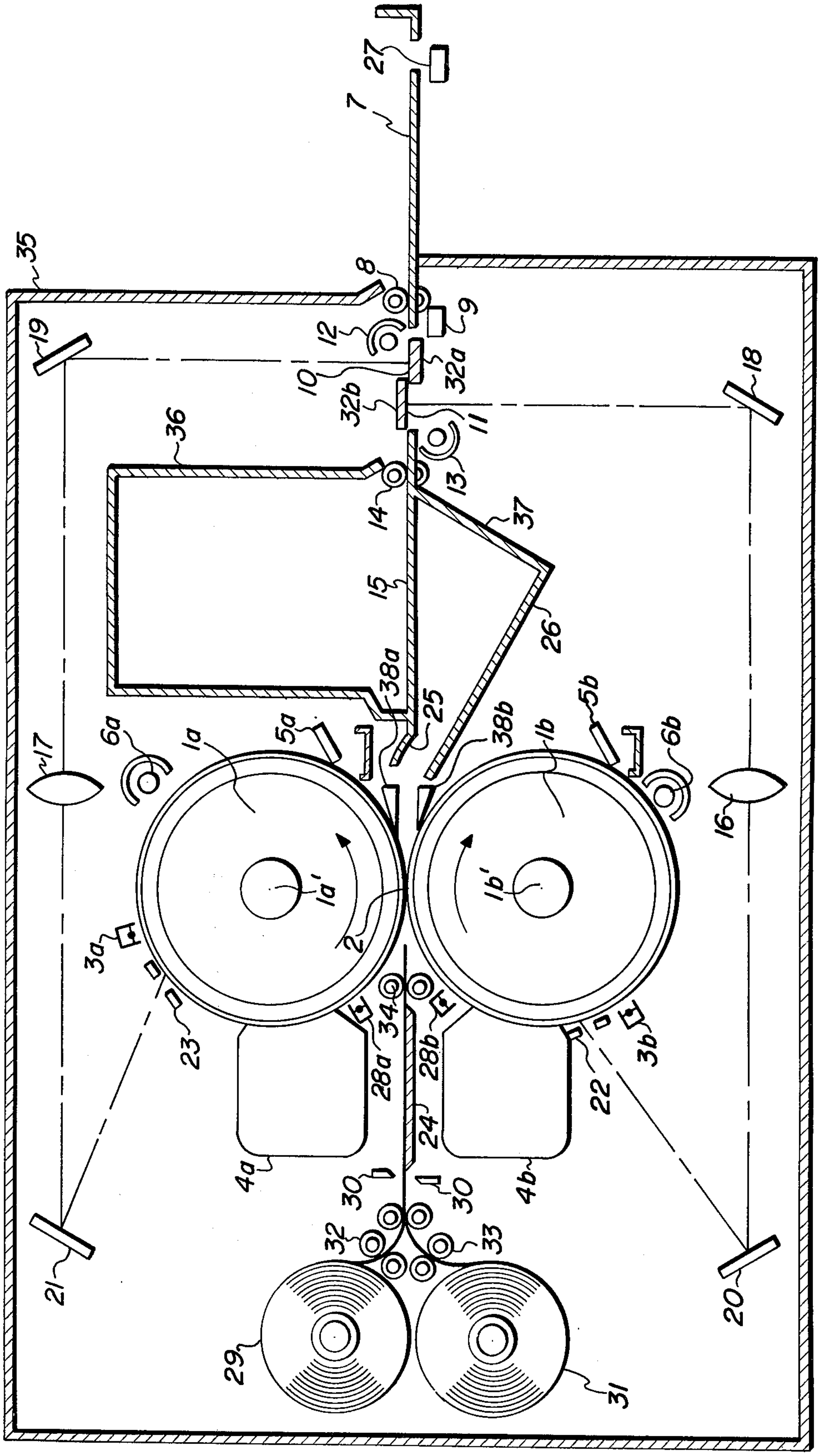
27
7
35
8
9
12
19
10
32a
18
32b
11
36
13
14
37
15
26
38a
25
38b
5a
5b
1a
1b
6a
6b
17
16
1a'
1b'
2
3a
23
34
28a
28b
22
3b
24
4a
4b
30
30
32
33
21
20
29
31

ELECTROSTATOGRAPHIC METHODS AND APPARATUS

This invention relates to electrostatography and more particularly, it relates to methods and apparatus for forming electrostatographic reproductions on two back-to-back support surfaces.

In the process of xerography, for example as disclosed in U.S. Pat. No. 2,297,681, a plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with electrostatically charged, finely-divided material such as an electroscopic powder that is brought into surface contact with the photoconductive layer and is held thereon electrostatically in a pattern corresponding to the electrostatic latent image. Thereafter, the developed xerographic image is usually transferred to a support surface to which it may be fixed by any suitable means.

In recent years there has been a growing use of xerography in automatic drum-type copying machines for producing full size copies from microfilm intermediates or from full-size originals, as shown, for example in U.S. Pat. Nos. 3,049,968 and 3,076,392.

The widespread use of xerography has been made possible by such developments as brush development, described in U.S. Pat. No. 3,015,305, powder cloud development described in U.S. Pat. No. 2,918,900, liquid spray development described in U.S. Pat. No. 2,551,582, cascade development described in U.S. Pat. No. 2,618,557 and liquid development described in U.S. Pat. No. 3,010,842.

The need for duplex copying from both a practical and economic point of view has been long recognized. Despite the long felt need, it has, heretofore, encountered handicaps which were unable to be resolved. First, the fusing step as conventionally performed utilizing heat or a solvent vapor causes the powder image to become soft and tackified which in the past has caused the always present problem of offsetting and smudging particularly where both sides of the sheet were subjected to heat or vapor simultaneously. Second, where sequential transfer was attempted to opposite sides of a sheet, long time delays were required to assure complete fusing of the first side before attempting transfer to the second side. Alternatively, complicated scheduling was required for subsequent interspersing of the various pages. Thirdly, as is known, heat fusing causes crinkling as well as drying of the paper support sheet, such that it is difficult to get uniform contact for a subsequent electrostatic transfer step while at the same time imposing a fire hazard by subjecting the already dried paper to a subsequent heating fusing step. Thus, these prior handicaps have prevented the emergence 2 duplex copying on a commercial scale.

It is an object of this invention to provide methods and apparatus for effecting duplex electrostatographic reproduction in which the above difficulties are alleviated or overcome and, to this end, from one aspect, the invention provides apparatus for forming reproductions electrostatographic on two back-to-back support surfaces contained respectively on two document surfaces, said machine including first and second photoconductive imaging surfaces, means for moving said photoconductive imaging surface, a first imaging station for forming an electrostatic latent image on said first photoconductive imaging surface, a second imaging station for forming an electrostatic latent image on said second photoconductive surface, means associated with each photoconductive surface for developing said first and second electrostatic latent images respectively, and means for moving said support surfaces into contact with the photoconductive surfaces at a transfer station, so as simultaneously to transfer the developed images from the photoconductive surfaces onto said support surfaces respectively.

One embodiment of a duplex copying machine of this invention enabling two sides of a double sided document to be simultaneously reproduced on opposite sides of a copy substrate, includes two imaging photoreceptive drums arranged back-to-back to form a nip therebetween. Simultaneous with the document scan, the photoreceptor drum is charged and imaged with the scanned document. Each photoreceptive drum then carries an image from a respective side of the paper on its surface. The latent image on the drum is developed and in time sequence a copy substrate is advanced towards the nip formed by the area of contact between the two photoreceptors. The paper enters the nip area simultaneously with the developed image on each of the two drums. The paper advancing through the nip receives the transferred developed image simultaneously on both its sides and is then passed through to the machine output tray.

For subsequent copies the document may be returned to the scanning area and again run through the scan cycle. Book copying can be achieved by hinging away the components above the document plane and transversing the book across the scanning plate. The printing rate of the machine may be increased by the use of the two paper rolls and copying one side only of the document at a double output rate. This is accomplished simply by feeding in an original and a copy of the document back-to-back. Where two toned transparencies are desired, translucent copy paper may be used with different coloured inks in the developer trays.

Other variations are the copying on two copy substrates of information on opposite sides of a single document and the copying on opposite sides of a single copy substrate, information on two back-to-back originals.

From another aspect, the invention provides an electrostatic reproduction apparatus for duplex printing of two documents, means for imaging each document including a first electrostatic drum having an exposure station for imaging one document, said drum having a developing station for developing the said image, said drum having a transfer station associated therewith to transfer the developed electrostatic image of said one document to one side of the support material, a second electrostatic drum having an exposure station to image the second document, said second drum having a developing station to develop the image and a transfer station arranged to transfer the developed electrostatic image of said second original to a second side of the support material, each of said exposure stations being arranged radially adjacent the periphery of its respective drum so the developed images arrive simultaneously at the transfer station, means for bringing each side of a support material simultaneously in contact with each of the imaged surfaces of the drum at the transfer station to simultaneously transfer the image from the drum to the support material.

A specialized use of a machine of this invention would be the copying of long documents such as computer fan-fold sheets. The sheets are fitted into the scanning plate in double back format and printed in either simplex or duplex.

The invention also provides, from a further aspect, a method for electrostatographically reproducing on two back-to-back support surfaces, information contained respectively on two document surfaces, comprising exposing one of said document surfaces to form an electrostatic latent image on one photoconductive imaging surface, exposing the other of said document surfaces to form an electrostatic latent image on a second photoconductive imaging surface, developing said latent images and simultaneously transferring the developed images from the photoconductive surfaces onto said support surfaces respectively.

In order that the invention may be more readily understood, reference will now be made to the accompanying drawing which shows a schematic sectional elevational view of one embodiment of apparatus according to the invention.

Referring to the drawing, the apparatus shown includes two semi-hard photoreceptor drums 1*a* and 1*b* which are rotatable about axes 1*a'* and 1*b'* respectively. The rotational axes 1*a'* , *and 1b'* are directed normally to the plane of the paper. Radially disposed around the outer periphery of the photoconductor drums are charging corotrons 3*a* and 3*b*, developing stations 4*a* and 4*b* and erase lamps 6*a* and 6*b*, respectively. Also radially arranged on the periphery of the drum is exposure slit 23 for photoreceptor drum 1*a* and exposure slit 22 for photoreceptor drum 1*b*. As can be seen from the FIGURE each drum has discharge corotrons 28a and 28b respectively. A motor is provided for driving the two drums which is not shown in the drawing but which is understood as necessary to practice the invention.

The two semi-hard photoreceptors 1*a* and 1*b* are spacially arranged to form a nip 2 at their single area of contact.

A document loading tray 7 is provided with a limit switch 27 operated as described below. Along side of the document tray 7 in the direction of document travel and in the direction of the photoreceptors is a set of rollers 8 followed by a trip switch 9. Immediately to the left of the trip switch 9 and in the direction of the document travel are imaging areas 10 and 11 with each imaging station backed on its non-imaging side by opaque backing plates 32*a* and 32*b*. Illumination lamps 12 and 13 are provided for illuminating the document at imaging stations 10 and 11 respectively. A second pair of rollers 14 are shown to the left of the imaging stations 10 and 11. A collection tray 15 is provided for receiving and holding the documents imaged and produced.

Lenses 16 and 17 and mirrors 18 and 19, 20 and 21 cause the images from each document to be formed on drums 1*a*, 1*b* through respective drum exposure slit 22 and 23.

31 copy substrate is provided from copy paper roll 29 which is fed into the machine through rollers 32 and 34 and is cut to length by guillotine 30. A second copy paper roll 41 is provided and paper from that roll is fed in by rollers 33 and cut to length by guillotine 30. The internal area of the machine is maintained light tight by machine exterior covering 35 shown extending from the bottom of document tray 7 and around the machine to maintain the intrusion of stray radiation into the machine to a minimum. The machine area enclosing the photoreceptors, and the developing area and the transfer area is maintained additionally light tight by providing a second enclosure 36 internal to the machine extending from the document receiving tray 15, to the rollers 14 and third enclosure 37 encompassing tray 26. Enclosure 37 may be hinged so copies may be removed.

A document to be copied is placed on document tray 7 and run through the rollers 8 tripping the switch 9 and travelling across imaging area 10 and 11. Lamps 12 and 13 are turned on to suitably illuminate the document.

In accordance with the electrographic process, the photoreceptor 1*a* and 1*b* are rotated in synchronism with the document travel across the imaging area.

The opposite sides of the document are illuminated in a staggered manner. This is done for the purpose of preventing transmitted light from causing unwanted images. Staggering causes a timing difference between the imaging of each document. This time difference is compensated by adjusting distances which the images have to travel around the circumference of the drum so that the images arrive simultaneous at nip 2. In this way the transfer on both sides of the copy substrate is accomplished simultaneously. The imaging at slit 22 from imaging area 11 occurs a short time after the imaging at slit 23 from imaging area 10 and in accordance with the staggered imaging at images 10 and 11. In this connection, the slit 23 is located in advance relative to the location of slit 22 and in respect to the drum travel.

In accordance with the process, corotrons 3*a* and 3*b* charge the respective photoreceptive drums. As the drums travel in the direction shown by the arrows, past respective slits 22 and 23, the image projections from the imaging stations 10 and 11 produce latent electrostatic images on the drums 1*a* and 1*b* respectively. As the drum surfaces continue in their movement, the respective electrostatic latent images pass through developing stations 4*a* and 4*b* which effects development of the latent images on the drum. Two additional corotrons 28*a* and 28*b* are shown between the developing stations 4*a* and 4*b* and the nip 2. These corotrons may be used to discharge the drums prior to the copy paper reaching nip 2 and prevent the charge on one drum affecting the print from the other drum. Alternatively, lamps may be used for this purpose.

The developing process may be dry or liquid or a combination. In synchronism with the introduction of a document to the imaging areas 10 and 11 and the rotation of the drums, a copy substrate is advanced from roller 29 through the roller 32 and 34 and cut to length by guillotine 30. The advancement of the copy substrate towards nip 2 is synchronized with the rotation of the photoreceptor and the scanning of the document such that the leading edge of the developed images arrive simultaneously at the nip with the leading edge of the copy substrate. In this manner, duplex copying on both sides of the paper is accomplished simultaneously. Paper stripping stations 38*a* and 38*b* are located radially on the periphery of the respective drums and serve to strip the copy substrates from the respective drums after transfer has taken place at the nip. The strippers may be any suitable device being known to those skilled in the art. One such device in common use is the air knife using a multiplicity of air jets designed to separate the copy from the drum and into the paper tray chute 25.

After transfer the xerographic drum surface is rotated past cleaning stations 5*a* and 5*b* where residual developing material on the drum surface is removed. Lamps 6*a* and 6*b* are provided to completely flood the drum surface with light to remove any residual electrostatic charge that may remain thereon.

Where it is desired to copy one side only of a document at a double output rate, the lower paper roller 31 may be utilized. In this connection, the procedure is to make one copy of the document and then feed the copy back-to-back with the original document into the imaging stations 10 and 11 while paper from the lower paper roll 31 feeds simultaneously with upper roll 29. The two substrates are fed then into nip 2 simultaneously, with the results that the document at image station 10 would be printed on the copy substrate from roll 29 and the document at image station 11 would be printed on the copy substrate from paper roll 31.

To add to the versatility of this copying machine, book copying may be achieved by simply hinging away all the components above the document plane; i.e. rolls 8 and 14, a lamp 12 and backing plate 32*b*. The open book is then placed on the imaging station and travelled across the imaging station for copying. Accordingly, the position of mirror 18 may have to be adjusted for the longer optical path experienced while copying a book wherein the documents are imaged from one side of the image area. This can be accomplished by suitable machinery not shown which automatically moves the mirror to compensate for the lengthened optical path.

These machine parts include means for rotating photoreceptor drums 1*a* and 1*b* and a mechanism for advancing a document into the imaging areas and then into the document tray and means for simultaneously putting through a copy substrate into the transfer station at nip 2. The synchronized operation of the machine parts may be accomplished by suitable control logic (not shown).

While a particular embodiment has been described, it will be appreciated that various modifications may be made without departing from the scope of the invention as defined in the appended claims. For example, the document may be held stationary and may be imaged by a moving optical station in sychronism with the rotating drum.

What we claim is:

1. Apparatus for forming electrostatographic reproductions onto back-to-back support surfaces, said machine including a first movable photoconductive imaging surface, a second movable photoconductive imaging surface disposed opposite said first photoconductive imaging surface to form a transfer station therebetween, a first imaging station for forming an electrostatic latent image on said first photoconductive imaging surface, a second imaging station displaced relative to said first imaging station for forming an electrostatic latent image on said second photoconductive surface, said images being formed sequentially on said first and second imaging surfaces, the image on said second imaging surface being formed at a location thereon displaced relative to the image formation location on said first imaging surface corresponding to the displacement of said first and second imaging stations, means associated with each photoconductive surface for developing said first and second electrostatic latent images respectively, and means for moving said support surfaces into contact with the photoconductive surface at the transfer station to simultaneously transfer the developed images from the photoconductive surface onto said support surfaces respectively.

2. Apparatus as claimed in claim 1, wherein said means for moving the support surfaces is adapted to move a single support element, the opposite faces of which define said support surfaces.

3. Apparatus as claimed in claim 1 wherein the latent images formed on said first and second photoconductive imaging surfaces are produced in a staggered timed sequence.

4. Apparatus as claimed in claim 1, wherein said photoconductive surfaces are defined by the peripheries of two rotatable drums which are so mounted as to define a nip therebetween constituting said transfer station.

5. Apparatus as claimed in claim 4; wherein the position of the imaging station for said first photoconductive surface is advanced relative to drum rotation and the position of the imaging station for said second photoconductive surface, said imaging stations for said fist and second photoconductive surfaces being circumferentially positioned so that the developed images on the photoconductive surfaces are synchronized simultaneously at said nip.

6. An electrostatic reproduction apparatus for duplex printing of two documents, means for imaging said documents sequentially including a first electrostatic drum having an exposure station for imaging one document, said drum having a developing station for developing the said image, said frum having a transfer station associated therewith to transfer the developed electrostatic image of said one document to one side of the support material, a second electrostatic drum having an exposure station to image the second document, said second drum having a developing station to develop the image, said transfer station being arranged to transfer the developed electrostatic image of said second document to a second side of the support material, said exposure stations being arranged radially adjacent the periphery of their respective drum and staggered relative to each other to compensate for the sequential imaging of the documents so that the developed images arrive simultaneously at the transfer station, means for bringing each side of a support material simultaneously into contact with each of the imaged surfaces of the drum at the transfer station to simultaneously transfer the image from the drum to the support material.

7. Apparatus as claimed in claim 6, wherein the means for imaging staggers the imaging for the first drum with respect to the imaging for the second drum.

8. Apparatus as claimed in claim 7, wherein the exposure station of the first drum is located in advance of the exposure station of the second drum for receiving the first of the staggered images.

9. Apparatus as claimed in claim 8, wherein said electrostaic drums contact each other to form a nip area, said developed images on said drums reaching the nip simultaneously.

10. Apparatus as claimed in claim 1 wherein the means for moving the support surface comprises means to move two support elements arranged in face-to-face relation, the remote faces of which define said support surfaces.

* * * * *